US007849680B2

(12) United States Patent
Shaff et al.

(10) Patent No.: US 7,849,680 B2
(45) Date of Patent: Dec. 14, 2010

(54) DIESEL PARTICULATE FILTER SYSTEM FOR AUXILIARY POWER UNITS

(75) Inventors: Richard Shaff, Reno, NV (US); Raymond English, Reno, NV (US); Edward Patrick Picton, Reno, NV (US)

(73) Assignee: Go Green APU LLC, Altoona, PA (US)

( * ) Notice: Subject to any disclaimer, the term of this patent is extended or adjusted under 35 U.S.C. 154(b) by 146 days.

(21) Appl. No.: 12/321,304

(22) Filed: Jan. 16, 2009

(65) Prior Publication Data

US 2009/0136387 A1 May 28, 2009

Related U.S. Application Data

(63) Continuation-in-part of application No. 11/899,682, filed on Sep. 7, 2007.

(60) Provisional application No. 61/011,579, filed on Jan. 17, 2008.

(51) Int. Cl.
| F01N 3/00 | (2006.01) |
| F01N 5/04 | (2006.01) |
| F01N 1/08 | (2006.01) |
| F02B 63/04 | (2006.01) |
| F02B 77/08 | (2006.01) |
| F02M 35/00 | (2006.01) |
| F02M 35/10 | (2006.01) |
| G05D 16/00 | (2006.01) |

(52) U.S. Cl. .............. 60/295; 60/280; 60/287; 60/297; 123/184.57; 123/319; 181/229; 181/270; 290/1 A; 290/1 B; 290/1 R; 422/112; 422/168

(58) Field of Classification Search .......... 181/270, 181/229; 60/280, 287, 295, 297; 290/1 A, 290/1 B, 1 R; 123/184.57, 319; 422/112, 422/168

See application file for complete search history.

(56) References Cited

U.S. PATENT DOCUMENTS

| 3,545,222 | A | | 12/1970 | Petranek |
| 3,844,130 | A | | 10/1974 | Wahnish |
| 4,204,586 | A | * | 5/1980 | Hani et al. .......... 181/229 |
| RE30,306 | E | * | 6/1980 | Moore et al. ........ 181/229 |
| 4,448,157 | A | | 5/1984 | Eckstein et al. |
| 4,459,519 | A | | 7/1984 | Erdman |

(Continued)

OTHER PUBLICATIONS

CCS Lightning, "Product—Components—Auxiliary Power Unit" http://www.ccslightning.com/prod_comp_apu.asp Website, available as of at least Sep. 1, 2006.
International Truck and Engine Corporation, "International No Idle Auxiliary Power Unit Unveiled at Mid-America Trucking Show" http://www.internationaldelivers.com/site_layout/news/newsdetail. asp?id=730 Website, Article dated Mar. 23, 2006.
Kohler Power Systems, "Mobile Power 5 kW Diesel APU" http://www.kohlerpowersystems.com/1147042085605.html Website, available as of at least Sep. 1, 2006.
Willis Auxiliary Power System, "Stop Idling and Start Saving" http://www.auxiliarypowerdynamics.com/ product_details/index.html Website, available as of at least Sep. 1, 2006.
Trailer Body Builders, "APU takes over for main truck engine, powers cab devises and saves money" Website, Dec. 1, 2003.

(Continued)

Primary Examiner—Jeffrey Donels
Assistant Examiner—Christina Russell
(74) Attorney, Agent, or Firm—Alan G. Towner, Esq.; Pietragallo Gordon Alfano Bosick & Raspanti, LLP (57) ABSTRACT

A system for reducing the emissions produced by an engine affixed to a body during operation and reducing noise and vibration. The present invention is particularly related to a small form factor active/passive Diesel Particulate Filter system having an exhaust backpressure sensor, a heating element, a Diesel Oxidation Catalyst, a power relay switch, a filter and an electronic control unit for controlling the heating element based on backpressure detected by the sensor.

11 Claims, 7 Drawing Sheets

U.S. PATENT DOCUMENTS

| | | | |
|---|---|---|---|
| 4,667,480 A | | 5/1987 | Bessler |
| 4,682,649 A | * | 7/1987 | Greer .......................... 165/43 |
| 4,762,170 A | | 8/1988 | Nijjar et al. |
| 5,006,045 A | | 4/1991 | Shimoda et al. |
| 5,056,330 A | | 10/1991 | Isobe et al. |
| 5,177,978 A | | 1/1993 | Brown |
| 5,316,074 A | | 5/1994 | Isaji et al. |
| 5,333,678 A | | 8/1994 | Mellum et al. |
| 5,557,938 A | | 9/1996 | Hanson et al. |
| 5,557,941 A | | 9/1996 | Hanson et al. |
| 5,572,879 A | | 11/1996 | Harrington et al. |
| 5,596,878 A | | 1/1997 | Hanson et al. |
| 5,632,155 A | | 5/1997 | Sugiyama et al. |
| 5,678,512 A | * | 10/1997 | Colton .......................... 123/2 |
| 5,699,670 A | * | 12/1997 | Jurewicz et al. .............. 62/50.3 |
| 5,730,216 A | | 3/1998 | Viegas et al. |
| 5,968,107 A | | 10/1999 | Vogan et al. |
| 6,062,030 A | * | 5/2000 | Viegas ......................... 62/175 |
| 6,075,328 A | | 6/2000 | Notohara et al. |
| 6,095,427 A | | 8/2000 | Hoium et al. |
| 6,223,546 B1 | * | 5/2001 | Chopko et al. ................ 62/243 |
| 6,460,356 B1 | | 10/2002 | Tao et al. |
| 6,464,036 B1 | | 10/2002 | Yenner et al. |
| 6,497,095 B2 | * | 12/2002 | Carberry et al. .............. 60/295 |
| 6,625,504 B2 | | 9/2003 | Landreth |
| 6,659,221 B2 | * | 12/2003 | Kuroda et al. .............. 181/214 |
| 6,736,238 B2 | | 5/2004 | Kerr |
| 6,796,859 B1 | | 9/2004 | Justen et al. |
| 6,892,531 B2 | * | 5/2005 | Rim ............................. 60/295 |
| 6,964,260 B2 | * | 11/2005 | Samoto et al. ......... 123/406.13 |
| 7,049,707 B2 | * | 5/2006 | Wurtele ....................... 290/1 B |
| 7,263,825 B1 | * | 9/2007 | Wills et al. .................... 60/295 |
| 7,290,592 B2 | * | 11/2007 | Larson ......................... 165/41 |
| 7,566,425 B2 | * | 7/2009 | Zuberi ......................... 422/180 |
| 2002/0078681 A1 | * | 6/2002 | Carberry et al. .............. 60/280 |
| 2002/0078684 A1 | * | 6/2002 | Carberry et al. .............. 60/295 |
| 2003/0070849 A1 | * | 4/2003 | Whittaker .................. 180/68.2 |
| 2004/0100094 A1 | | 5/2004 | Thomas et al. |
| 2004/0169374 A1 | * | 9/2004 | Wurtele et al. .............. 290/1 A |
| 2004/0226287 A1 | * | 11/2004 | Edgar et al. ................... 60/295 |
| 2004/0231831 A1 | | 11/2004 | Houck et al. |
| 2005/0035657 A1 | * | 2/2005 | Brummett et al. .......... 307/10.1 |
| 2005/0076666 A1 | * | 4/2005 | Parks et al. ................. 62/323.4 |
| 2005/0086933 A1 | * | 4/2005 | Nieuwstadt et al. ........... 60/297 |
| 2006/0025904 A1 | * | 2/2006 | McGee et al. .................. 701/22 |
| 2006/0107663 A1 | | 5/2006 | Filippone |
| 2006/0131885 A1 | * | 6/2006 | Wurtele ...................... 290/1 A |
| 2006/0173586 A1 | * | 8/2006 | Swanson ........................ 701/1 |
| 2007/0104620 A1 | * | 5/2007 | Zuberi ........................ 422/177 |
| 2007/0220871 A1 | * | 9/2007 | Zuberi et al. .................. 60/299 |
| 2007/0245714 A1 | * | 10/2007 | Frazier et al. .................. 60/276 |
| 2008/0023965 A1 | * | 1/2008 | Cagliari et al. .............. 290/1 B |
| 2008/0041045 A1 | * | 2/2008 | Zhan ........................... 60/301 |
| 2008/0066446 A1 | * | 3/2008 | Sangiovani ................... 60/274 |
| 2008/0196391 A1 | * | 8/2008 | Huang .......................... 60/280 |
| 2009/0019839 A1 | * | 1/2009 | Gray, Jr. ....................... 60/287 |
| 2009/0065294 A1 | * | 3/2009 | O'Malley et al. ............. 181/229 |
| 2009/0152934 A1 | * | 6/2009 | Devries et al. .............. 298/1 H |
| 2010/0031644 A1 | * | 2/2010 | Keane et al. .................. 60/295 |
| 2010/0071354 A1 | * | 3/2010 | Brahma ....................... 60/295 |

OTHER PUBLICATIONS

Big Rig Owner—Richard Stewart, "Road Smart—Powering Your Sleeper—Auxiliary Units Mean Freedom from Idling" http://www.bigrigowner.com/articles/0705rs.html Website, available as of at least Sep. 1, 2006.

Truck Gen & Air Services, "See the Light . . . Save the Money" http://www.truckgen.com/index.html Website, available as of at least Sep. 1, 2006.

Frigette Truck Climate Systems, "Frigette Truck Climate Systems—Hybrid APU System with 3.5 KW Generator" http://www.guthriesales.com/frigette.html Website, available as of at least Sep. 1, 2006.

Carrier, "Comfortpro—Auxiliary power unit with Deltek hybrid diesel-electric technology" Sales Literature, No available publication date.

Black Rock Systems LLC, "The Road to Cost Effective Comfort Starts with the Blackrock APU—Blackrock APU—Auxiliary Power Unit.", http://www.blackrockapu.com, available as of at least Oct. 10, 2006.

* cited by examiner

DIESEL PARTICULATE FILTER SYSTEM FOR AUXILIARY POWER UNITS

CROSS-REFERENCES TO RELATED APPLICATIONS

This is a utility patent application, taking priority from provisional patent application Ser. No. 61/011,579, filed Jan. 17, 2008, which application is incorporated herein by reference, and a continuation-in-part of U.S. patent application Ser. No. 11/899,682, filed on Sep. 7, 2007.

BRIEF DESCRIPTION OF THE INVENTION

The present invention is related to systems for reducing the emissions produced by an engine affixed to a body during operation and reducing noise and vibration. The present invention is particularly related to a small form factor active/passive Diesel Particulate Filter (DPF) system having an exhaust backpressure sensor, a heating element, a Diesel Oxidation Catalyst (DOC), a power relay switch, a filter and an electronic control unit for controlling the heating element based on backpressure detected by the sensor.

STATEMENT AS TO THE RIGHTS TO INVENTIONS MADE UNDER FEDERALLY SPONSORED RESEARCH OR DEVELOPMENT

Not Applicable.

REFERENCE TO A "SEQUENCE LISTING," A TABLE, OR A COMPUTER PROGRAM LISTING APPENDIX SUBMITTED ON A COMPACT DISK

Not Applicable.

BACKGROUND OF THE INVENTION

Long-haul trucks transport goods over great distances in all parts of the world. In California alone, there are approximately 180,000 transport trucks in operation. Since the operators of long-haul trucks spend many days at a time on the road, the cabins for such trucks typically include a bed, as well as microwaves, air conditioners and heaters, refrigerators, televisions, stereos and other electric appliances that require significant amounts of power. Long-haul trucks equipped with this type of cabin are referred to as sleeper berth vehicles.

In thirty states and the District of Columbia, many different types of vehicles, including sleeper berth vehicles, are not allowed to idle their main engines for a period longer than five minutes, which is why more of these vehicles are installing auxiliary power units (APU's) to run in place of the main engine when the drivers are attempting to sleep or making use of the other convenience features of the vehicles. While these laws are more rigorous in some states, such as California, than other states, emissions standards are becoming increasingly more rigorous nationwide.

According to regulations promulgated by the California Air Resources Board (CARB), all trucks of model year 2007 or higher must have a level three DPF system installed. A level three DPF system is classified as having an 85% or higher reduction in particulate matter or a less than 0.01 g·bhp-hr (grams per brake horsepower per hour) emission level. Additionally, in order to meet level three DPF system requirements, the DPF system must have the exhaust plumbed into the vehicle's exhaust system upstream of the particulate matter after-treatment device. The ultimate goal of CARB's new regulation is to reduce public exposure to diesel particulate matter and other contaminants by limiting the idling of diesel fueled commuter motor vehicles and the emissions created by the idling of such vehicles. With the average truck idling for 2,500 hours per year, one can imagine the amount of particulate matter being put into the air.

With the aforementioned regulations being enforced, it has become necessary for owners and operators of diesel fueled trucks to find an alternative, economical way to operate their trucks without breaking the regulations. Similarly, since some large trucking fleet companies have over 100% turnover from year to year as a result of operator dissatisfaction, fleet companies are always seeking new ways to attract drivers, such as by providing them with a luxurious cab environment that includes many of the comforts and conveniences of home, such as the ability to utilize multiple appliances at one time. Considering that the current average cost to train a new driver is between $3,000 and $5,000, it seems key to the financial success and longevity of a company to do what they can to retain their current employees.

Accordingly, in order to operate multiple appliances, adequately heat/cool the cabin, and maintain happier operators, a number of companies have begun to affix APU's to their trucks to provide climate control and 120 volt power, to cut back on fuel consumption and air pollution, to reduce operating hours on the main vehicle engine, and to improve the overall quality of life of the driver/operator. With the current average price for a gallon of diesel gasoline around $2.37 per gallon and an idling engine consuming 1.2 gallons per hour, it is becoming prohibitively expensive for drivers to idle their engines for long periods of time. With an average idle time of 2,500 hours/year and $2.37 per gallon, idling without an APU costs more than $7,000 per year. A typical APU consumes between 0.2-0.3 gallons per hour, which saves more than $5,000 per year in fuel costs alone. These facts don't consider the new regulations being instituted to reduce air pollution.

While it is known to include a DPF system on certain types of diesel engines, the need to incorporate DPF systems into APU's is a new problem and presents a number of different issues not previously addressed with DPF systems. In particular, many DPF systems on engines are passive regeneration systems because the temperature of the exhaust gases generated by the engines is sufficient to ignite the particulate matter and initiate oxidation in the presence of a wall flow filter, either catalyzed or non-catalyzed. Smaller engines, such as those used for APU's do not typically generate sufficient exhaust temperatures to induce oxidation unassisted. Active regeneration systems, however, are large and expensive, which make their incorporation into an APU impractical. A typical solution to this problem is to equip the APU engines with low exhaust temperatures with large filter units that can collect large amounts of particulate matter before requiring regeneration. While the filters are large, and that can be problematic, the filters can be located remote from the APU on a portion of the truck chassis that affords more space. When regeneration is required, the engine must be serviced to remove the filter and clean out the particulate matter, either using a cleaner or an active regeneration process that will ignite the particulate matter. Naturally, servicing the engine to clean out the filter adds complication to ownership of the engine and DPF system and increases the cost of operating the engine.

In addition to the need to decrease emissions levels, APU's are typically noisy to operate. Even with a muffler installed on the exhaust system, they tend to output a significant level of noise and generate a significant amount of vibration throughout the cabin, especially when the engine is mounted under the cabin or attached to the frame rail of the truck. In many cases, airborne noise, such as that produced by the cylinder exhaust ports of the engine, is propagated in and transmitted through the exhaust pipe wall and radiated as shell noise or transmitted to the vehicle through the engine mounts. As such, mufflers which typically include a resonating chamber that is designed to have opposite sound waves collide and cancel each other out, are utilized to reduce exhaust noise.

Internal combustion engines also typically include an air intake system for receiving air that is later mixed with fuel and combusted in the engine's cylinders. Noise from the engine, however, also typically travels through the air intake system, through the engine, and back into the atmosphere. In certain smaller engines, especially where the exhaust is in close proximity to the air intake, such as in an APU, noise traveling from the engine through the air intake can be a significant noise source. Air intake silencers have typically been used to muffle and reduce the resultant level of noise produced by these types of engines. Additionally, noise reduction is often achieved by the provision of sound dampeners such as baffles within the silencer housing as a result of attenuating the sound waves produced by the entering air. Such silencers are most commonly constructed as a combined air silencer/filter module. However, having a filter placed in the upstream direction of the airflow near the silencer can also generate increased levels of noise.

While mufflers and intake silencers can reduce noise and effectively reduce some level of vibration, the aforementioned noise reduction techniques are not typically focused on vibration reduction which may still exist in the absence of noise being attenuated by the muffler or silencer mechanisms. Furthermore, mufflers, DPF systems and other noise and vibration reduction technologies are often placed within the intake and exhaust systems of an engine, which can have an impact on airflow. Since DPF systems often require back pressure within the exhaust to be tightly regulated to insure a sufficient quantity of particulate matter in the exhaust is removed, it can be difficult to reduce the sound and vibrations generated by an APU when a DPF system is installed because the introduction of the noise and vibration technology may impact the operability of the DPF system.

DETAILED DESCRIPTION OF THE INVENTION

The present invention is related to a small form factor, active/passive diesel particulate filter (DPF) system for an auxiliary power unit (APU), and more particularly to a DPF system for connection to the exhaust system of an APU that also includes noise and vibration reduction components on the intake system.

Figure 1:
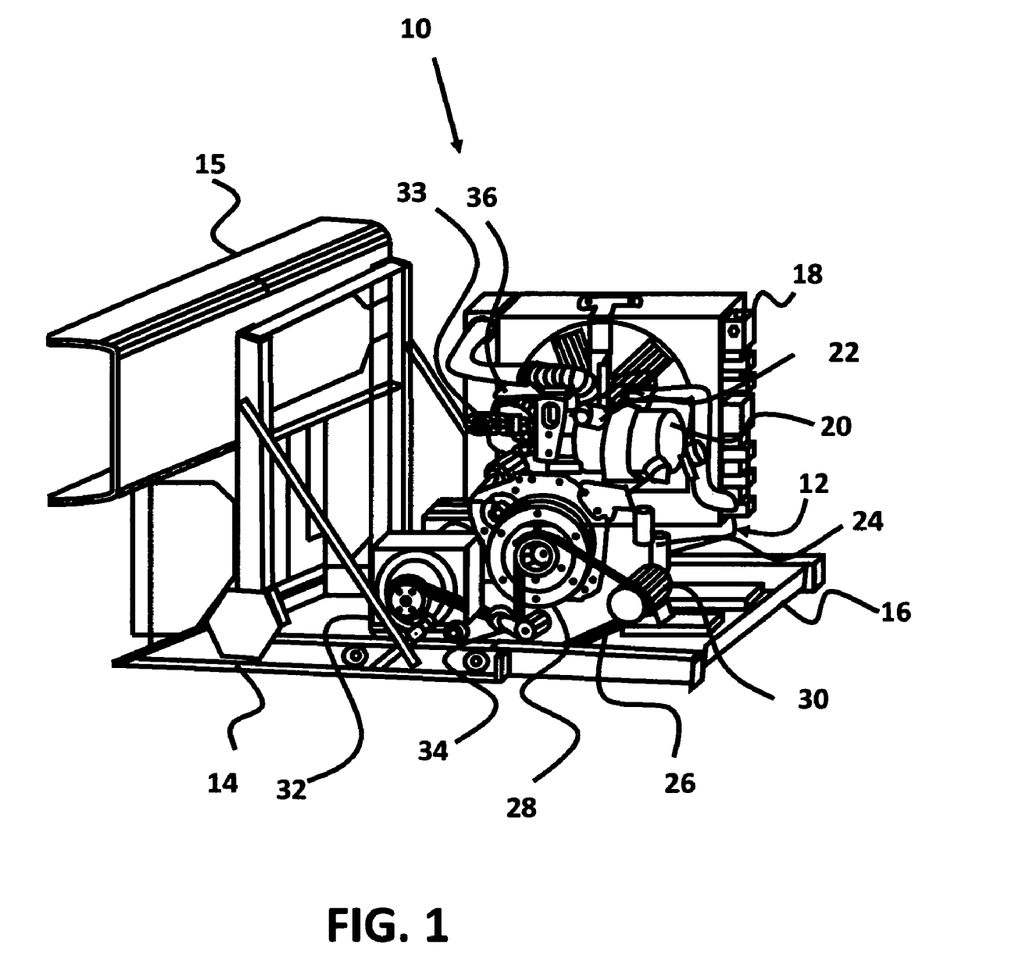
FIG. 1 is a perspective view of the front and left side (when facing the APU from the side of the truck) of an APU in its service/maintenance position.

Due to the structural integrity of the frame rails of a truck or similar vehicle, an APU is ideally mounted to one of the frame rails to provide a very stable mounting environment. The APU shown in FIG. 1 is mounted to a frame rail via a frame assembly. However, it is not always possible or feasible to mount the APU to the frame rails, so APU's are often mounted below or attached to the cabin of the truck. Mounting the APU close to the cabin can reduce the cost of the installation by reducing the length of the umbilical cord (primarily comprised of electrical lines) between the APU and the truck cabin where the main controller for the APU is located. At the same time, mounting the APU close to the cabin increases the truck driver's awareness of the sound of the APU and the driver's sensitivity to vibrations created by the operation of the APU.

While FIG. 1 illustrates an APU mounted to a frame rail via a frame assembly, the present invention is applicable to any mounting location or type of mounting for an APU or other type of engine to a body, such as a truck, car, airplane, other form of transportation, or even a building. FIG. 1 provides a perspective view of the front and left side of APU 10 when viewed facing the side of the truck to which the APU 10 is mounted. The APU 10 includes the APU engine 12, which is a two or three cylinder diesel engine mounted to a frame assembly 14, which includes a sliding component 16. Larger or smaller engines could obviously be used, but various parts, components, threshold levels, and other factors described herein would need to be sized appropriately to accommodate the size of the engine. The frame assembly 14 is attached to the frame rail 15 of the truck, but the sliding component 16 enables the entire diesel engine 12 to be pulled away from the truck and easily accessed by anyone needing to service the engine.

FIG. 1 illustrates the APU engine 12 when the sliding component 16 has been partially pulled away from the frame assembly 14, such as when it is being serviced. In order for the engine 12 to be pulled away from the truck on the sliding component 16, certain mechanical and electrical components need to be designed to facilitate this type of movement without breaking down over a number of years, such as the electrical wiring, hoses, exhaust pipes and other similar components. For example, the electrical wiring between the APU 10 and the truck cabin is provided through a spring-shaped umbilical cord consisting of power wires and communication wires. The spring shape of the cord enables it to stretch out when the APU is pulled away from the truck for service, and to shrink back into a smaller size when the APU is in its normal operating position, all without putting undue stress on the wires within the cord. Likewise, the exhaust pipe is connected with a flexible metal hose and a quick-fit connector, rather than welded in place.

As noted, the APU engine 12 is typically a two or three cylinder diesel engine capable of generating approximately 10-30 horsepower at varying revolutions per minute, such as the Yanmar™ TNV Series-1 engines, although other types and sizes of engines could be utilized. As illustrated in FIG. 1, some of the typical driven components of the engine 12, that are visible, include a water/coolant radiator 18, an air intake housing 20, its air intake spout 22, and fuel filters 24, on the right-hand side of the engine. At the front of the engine 12, driving or driven by the serpentine belt 26 are the engine flywheel 28, the air conditioning compressor 30, the AC power generator 32, and the belt tensioner 34. On the back left-hand side of the engine, the exhaust pipe 33 and the DC power alternator 36 are visible. The air conditioning compressor 30 and AC power generator 32 are optional components.

Figure 2:
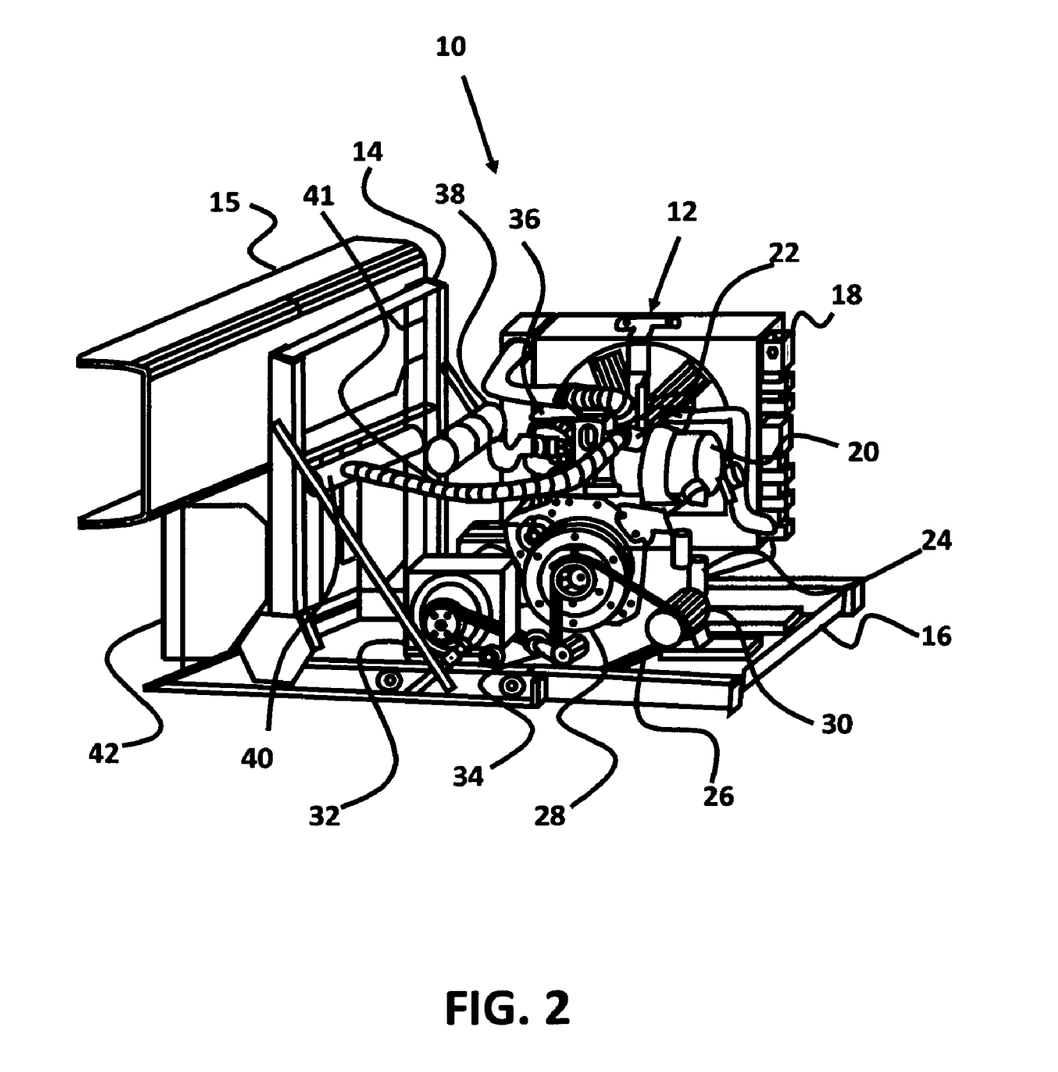
FIG. 2 is a perspective view of the front and left side of the APU of FIG. 1 with an air intake silencer installed on the frame assembly of the APU and a DPF system.

FIG. 2 illustrates the same engine 12 as in FIG. 1, but includes the DPF system 38 connected to the exhaust pipe 33 (labeled and shown in FIG. 1, but not labeled in FIG. 2) and air intake silencer 40, which is mounted to frame assembly 14. It is preferable to mount the air intake silencer 40 in a location that will enable the air intake silencer 40 to draw air for use by the engine 12 from an area that is not too close to the engine 12. Although the location of the air intake silencer 40 as illustrated in FIG. 2 is close to the engine, the air intake opening of the intake silencer 40 is positioned so as to draw air from the air intake 48 illustrated in FIG. 3, which allows the silencer 40 to draw air from outside of the environmental shell 44 (also illustrated in FIG. 3) in which the engine 12 is housed during use. Normally, the open end of the exhaust pipe 33 would need to be routed to a position that was away from the air intake of the silencer 40, but with the DPF system 38 installed, the exhaust is routed far away from the silencer 40. The air intake silencer 40 could also be mounted to a completely different part of the vehicle so as to be as far away from noise sources as possible.

Referring back to FIG. 2, regardless of where the air intake silencer 40 was located, it would be connected to one end of the flexible hose 41, the opposite end of which would be connected to the air intake spout 22 of the air intake housing 20. As shown in FIG. 2, the air intake silencer 40 is mounted in series with the air intake housing 20 (which may or may not include an air cleaner). Since many air intake housings provide some existing level of noise reduction, mounting the air intake silencer 40 in series with the air intake housing 20 serves to further reduce the level of noise generated by the engine 12. In the absence of an existing air intake housing 20, the air intake silencer 40 could be mounted directly to an air intake port for the engine 12. Alternatively, the air intake silencer 40 could be mounted in parallel with the existing air intake housing. Whenever the air intake silencer 40 is mounted directly to the air intake port of the engine 12, it is desirable to also provide some form of air filtration for the silencer 40 so as to keep dust and debris from being drawn into the engine.

Figure 3:
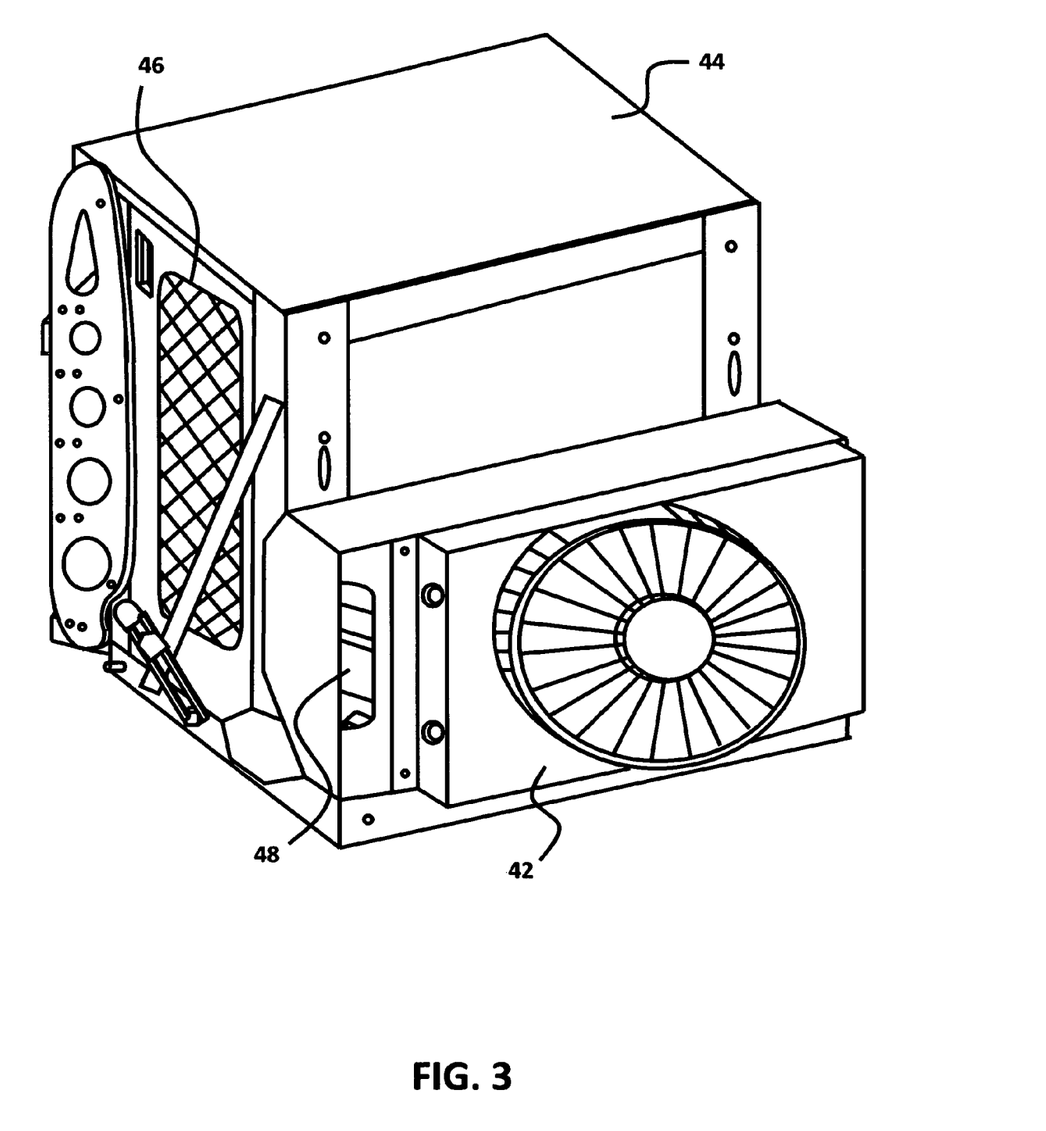
FIG. 3 is a perspective view of the APU within an environmental cover.

As further illustrated in FIG. 2, the backside of the air conditioning condenser and fan 42 is shown. A perspective view of condenser and fan 42 is further illustrated in FIG. 3. The condenser and fan 42 need not be co-located with the engine 12, if space in the area of the APU installation is at a premium, or if the owner/operator prefers to move the condenser and fan 42 as far away from the truck cabin as possible, so as to further reduce noise inside the cabin. As illustrated in FIG. 3, the APU 10 can be covered by an environmental shell 44, which further reduces the level of noise produced by the APU engine 12. FIG. 3 shows the APU 10 as positioned in its normal operating position. The environmental shell 44 provides protection to the APU engine 12 when the truck is on the road, while allowing sufficient air to move through the shell, such as through screen 46. As illustrated in FIG. 3, hot air surrounding the engine and the radiator is expelled through an opening in the environmental shell 44 and past screen 46.

Although air can enter the environmental shell 44 from a number of locations, air intake 48 can be important because it brings air into the shell 44 very close to the air intake opening of the air intake silencer 40, as described above. Air intake 48 also provides an access point through which wires and hoses can run in and out of the environmental shell 44. Since different types of trucks will require different types of APU 10 installations, with or without environmental shells of the type shown in FIG. 3, many different air intake/exhaust combinations could be utilized. It is preferable that air entering the air intake silencer 40 be cooler than the air being exhausted from the engine 12 and that the air routed to the air intake silencer 40 not introduce additional harmonics to the air being pulled into the engine 12 through the air intake silencer 40.

The internal design of the air intake silencer 40 is not critical to the present invention, as long as it serves to reduce noise being generated by the engine 12 and reduces vibrations generated by the APU 10. The appropriate design of an air intake silencer for use with the engine 12 of the present invention is described in U.S. patent application Ser. No. 11/899,682, which is incorporated in its entirety herein by reference, and which is co-owned by the assignee of the present invention.

One purpose of air intake silencer 40 is to change the harmonics of the air by smoothing the air flow and by canceling or attenuating sound waves coming in through the air intake silencer 40 before being led to the air intake housing 20. As air courses through the air intake silencer 40, sound waves carried along with the air are attenuated or cancelled out by the arrangement of the interior of the air intake silencer 40, thereby reducing the amount on noise introduced to the engine 12 through its air intake system and accordingly reducing the amount of noise exiting the engine 12 through its exhaust system.

While the sound waves introduced to the engine 12 are attenuated through use of the air intake silencer 40, further reductions can be achieved by reducing the normal engine speed of the engine 12. Engine 12 normally operates at an engine speed of 2850 rpm to 3200 rpm. By reducing the engine speed to about 2000 rpm, a significant sound reduction can be achieved. In particular, an almost 8 dB reduction in noise has been measured by combining the air intake buffer with the engine speed reduction and an appropriate muffler. Not only does lowering the engine speed reduce noise, but it also lowers fuel consumption and harmonics produced by the engine.

While it may seem fairly obvious to lower an engine's speed so as to reduce the amount of noise generated by that engine, reducing the engine's speed can have a negative effect on the operation of some of the engine driven components, therefore making it a less than obvious choice for achieving a constant level of noise reduction. For example, the AC power generator 32 needs to be rotated at a certain speed, via the serpentine belt 26, in order to generate 110 volts of AC power. Thus, simply reducing the speed of the engine 12, without utilizing a smaller pulley on the AC power generator 32 and shortening the serpentine belt 26 accordingly, would lower the operating speed of the AC power generator 32 to a point where it could no longer generate sufficient AC voltage to drive a desired load.

To correct this, a smaller diameter pulley can be used on the AC power generator 32 and the length of the serpentine belt 26 can be reduced by about one inch, which causes the AC power generator 32 to rotate at a higher rate than it typically would at a correspondingly reduced engine speed. With the lowered engine speed and the smaller pulley and adjusted drive belt 26, the engine 12 is still able to produce sufficient AC power to drive a needed load. For example, it was found that even with a load of 6000 W (the maximum load rating for the three-cylinder Yanmar™ TNV Series-1 engines used in this application), the AC power generator 32 was able to generate 98.1 volts AC, even at the optimum lower engine speed, with the adjusted pulley and the shortened serpentine belt, without causing the engine to stall.

Although some engines are electronically controlled such that engine speed can be controlled through program control, many engines, such as the Yanmar™ TNV Series-1 engines, have a manual throttle with a throttle limiter on the injection pump for adjusting engine speed. By replacing the standard throttle limiter with a threaded bolt and nut adjusted to an appropriate length, it is possible to adjust the maximum engine speed to the desired engine speed, which will be optimized for sound reduction for that particular engine, without otherwise altering the engine. As with AC power generation, when adjusting engine speed below certain RPM levels, it may be necessary to also adjust the fuel injection timing in order to obtain an optimum setting at which the engine can function properly.

In addition to reducing noise produced by the engine 12, reducing the speed of the engine can reduce vibrations generated by the engine. Since many truck drivers are used to sleeping in the presence of a noisy, vibrating main engine, one would tend to believe that any reduction in sound and vibrations would be appreciated, but this is not always the case. A driver's tolerance levels for noise and vibration can alter dramatically when an APU is installed, even though the APU may be much quieter than a main engine. Even a very quiet APU 10, with an air intake silencer 40 and a reduced engine speed, can over time produce intolerable levels of vibrations within the cabin of the truck. To make matters worse, every truck is different, so an APU that produces only a few vibrations when installed in one truck may produce intolerable levels when installed in another.

It is therefore preferable, when installing an APU 10 in a truck, to make slight adjustments to the speed of the engine so as to tune out as many vibrations caused by the APU 10 as possible. Even a change of up to 100 rpm, higher or lower, may be sufficient to reduce the most annoying vibrations, and from case to case may further achieve a noise reduction of up to 1 dB. With respect to the Yanmar™ engines noted above, this can be carried out by simply adjusting the position of the nut on the throttle limiter bolt—with a longer bolt increasing the speed and a shorter bolt decreasing the speed. As long as the engine speed is not changed by too many rpm, the engine speed should not have an adverse impact on the operating capabilities of the engine driven components.

While sound waves introduced to the engine 12 can be attenuated or reduced through use of the air intake silencer 40 and by reducing the normal engine speed to an optimum engine speed, still further reductions can be achieved through use of sound cancellation audio system. Such systems are well known in the art and need not be disclosed in detail herein for purpose of this invention. A basic sound cancellation audio system operates by detecting audible sound waves being generated by a source, such as an engine, and generating and broadcasting in near real-time cancelling sound waves, which are at half-wave frequencies of the detected sound waves. The sound waves would be detected in or near the inside of a vehicle cabin where a passenger would be located and the cancelling sound waves would be broadcast inside that cabin so as to cancel the detected sound waves.

Having addressed the noise and vibration issues presented by the intake system and the engine 12, the exhaust system and the DPF system 38 will now be addressed. The Diesel Particulate Filter (DPF) system, further illustrated in FIG. 4 as separated from the engine 12 of FIG. 2 has a very small form factor for an active/passive regeneration based DPF system. This enables the DPF to be entirely collocated with the engine 12 and for regeneration to be performed in real-time, versus requiring a larger passive filter that cannot be located with the engine 12 and must be cleaned out during a service call or with the engine disabled. As previously noted, all of the components and the various threshold levels, etc., noted below are based on engine 12 being a two or three cylinder engine from a particular manufacturer of such engines. Different engines from different manufactures, and of different sizes, would require a number of variations, including the size or power of certain components, the thresholds that apply, etc.

Figure 4:
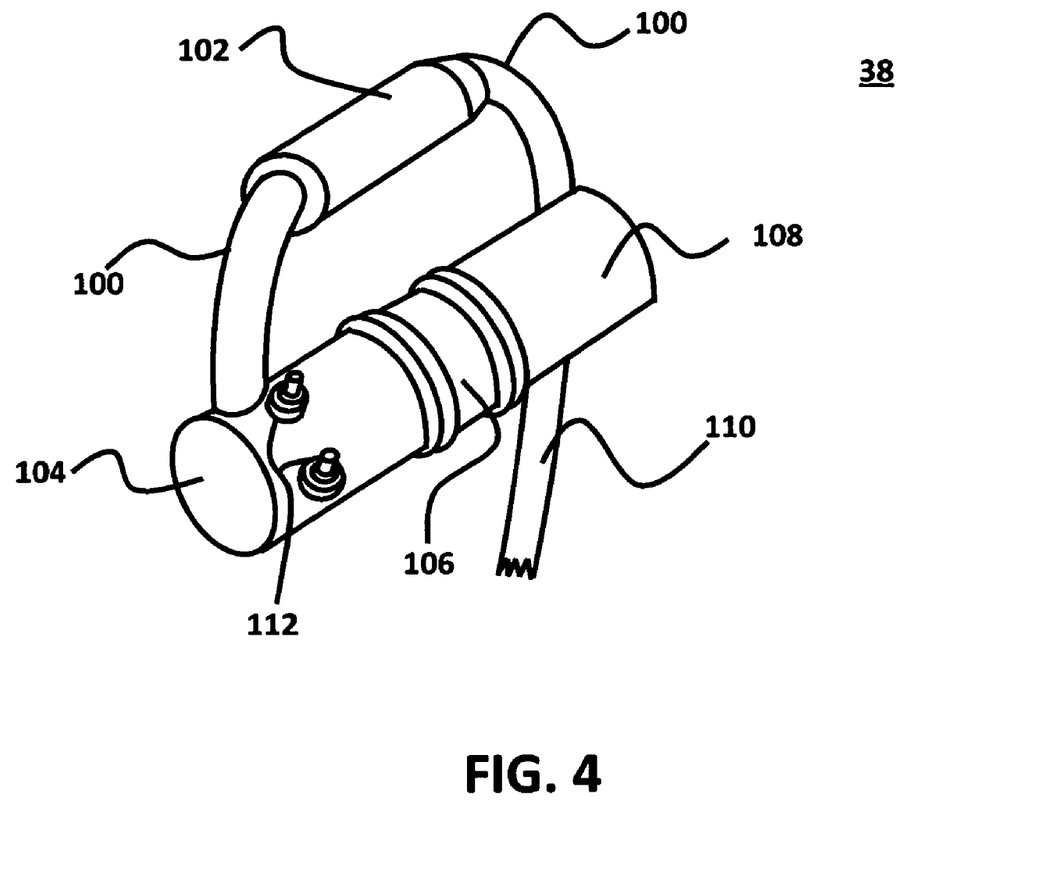
FIG. 4 is a perspective view of the DPF system of the present invention prior to installation.

The DPF system illustrated in FIG. 4 is comprised of a first pipe 100 that is connected to the exhaust port 33 of the engine 12, a flex pipe 102 (that allows for differential movements between the engine 12 and the APU mounting frame 14 to be accommodated), a heating element 104, a Diesel Oxidation Catalyst (DOC) 106, the filter assembly component 108, and a second pipe 110 for exhausting air from the engine 12. Not shown in FIG. 4 is an 18 kilopascals differential pressure transducer that is used to monitor exhaust backpressure within the DPF system (generally located in the first pipe 100 near the DPF system) and to send a signal to the Electronic Control Unit (ECU), as further described below. Also not shown in FIG. 4 is a DC-controlled AC power relay, which is controlled by the ECU and which switches the heating element on and off via the switch terminals 112, as further explained below.

The basic concept of the DPF system is to trap particulate matter, primarily $NO_2$ (nitrous dioxide) and C (carbon) from burned diesel fuel, normally present in the exhaust gas of the engine 12 until back pressure builds up within the first pipe 100 above a threshold level. When the regeneration threshold level is achieved, the ECU switches on the heating element 104 through the power relay and the switch terminals 112, causing heat to build up within the DPF system. As further discussed below, once the heat reaches a certain level, regeneration will begin and the DOC 106 will begin to aid the regeneration process and cause the particulate matter to continue to burn off within the filter assembly 108—a process referred to as regeneration.

Figure 5:
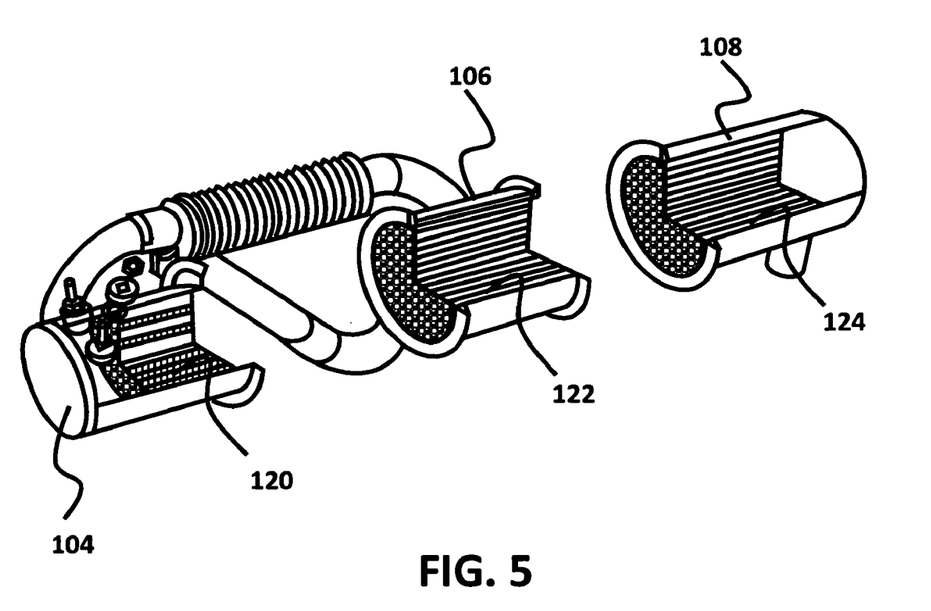
FIG. 5 is a partially cut-away perspective view of the DPF of FIG. 4.

As illustrated in FIG. 5, the heating element 104 includes a coil assembly 120 that is placed within the exhaust gas stream entering the DPF system from the first pipe 100 and has a surface area that is slightly larger than the surface area of the first pipe 100. For example, the first pipe has a cross-sectional surface area of approximately 2.4 square inches and the coil assembly 120 has a cross-section surface area of approximately 2.58 square inches. Hence, the surface area of the coil assembly 120 is approximately 107.5% of the surface area of the first pipe 100. To maintain a small form factor for the DPF system, so that it can be integrated with the engine 12 and installed in the same location as the engine, it is important to maintain the differential surface area between the first pipe 100 and the coil assembly to no more than 150%.

The wire wound heating coil of the coil assembly 120 is encased in a 1650° C. ceramic housing with a central, 60-hole, honeycomb-shaped passageway. For the present engine 12, a 2 kW coil is sufficient, but 3 or 4 kW coils could also be used. Larger coils may be required on larger engines. The windings of the heating coil are preferably constructed of NIKROTHAL™ 80 wire manufactured by Sandvik, with two extension wires with stainless steel terminals and ceramic terminal insulators connecting the heating element 104 to the switch terminals 112. The coil assembly 120 is suspended in INTERAM (a mat mount for catalytic converters produced by 3M that seals and protects the suspended item) and encased in a stainless steel container to create the heating element 104. The control circuit for the power relay switch (not shown in FIG. 5, but schematically illustrated in FIG. 6) is a 12 volt controlled, 110 volt AC, 30 amp switched, normally open relay.

As noted above, the DPF system is essentially a particulate matter trap that is designed to reduce output at levels greater than or equal to 85%. The DPF system is designed to absorb a certain amount of particulate matter before it requires the system to regenerate (oxidize the particulate matter to form a harmless ash). As a result of engine combustion, CO (carbon monoxide), NO (nitric oxide), $N_2$ (nitrogen), $CO_2$ (carbon dioxide), $H_2O$, and carbon are generated and passed through the first exhaust pipe 100. The regeneration process occurs as a result of NO and carbon in the exhaust passing through the DOC 106 being converted into $NO_2$, with then mostly reacts with carbon to generate nitric oxide and harmless ash. The oxidation of particulate matter is further enhanced by the exhaust water vapor, presumably due to the formation of $HNO_3$ from $NO_2$ and $H_2O$, which also reacts with carbon.

Oxidation can take place either passively or actively. Since the oxidation process requires temperatures of greater or equal to 340° C. in order for the process to begin, and the engine 12 has a relatively low exhaust temperature, active regeneration is required to start the process. Once regeneration has started, however, it will then continue passively, aided by the introduction of $NO_2$ from the DOC 106. The DOC 106 generates $NO_2$ through the combination of NO and ½$O_2$ as it passes across the catalyst 122, a monolith honeycomb substrate structure coated with platinum group metal catalysts, suspended in INTERAM and encased in a stainless steel container. The form factor (internal cross-sectional surface area) of the DOC 106 is approximately the same size as the coil assembly 120. A backpressure reading of between 23 and 30 inches of $H_2O$ will provide enough particulate matter (a minimum of 7 grams) for the regeneration process to commence, so the heating element 104 is switched on when this threshold level is reached.

The DOC 106 promotes the chemical oxidation of carbon monoxide (CO), gas phase hydrocarbons (HC) and the organic fraction of diesel particulates (SOF). The DOC 106 also oxidizes $SO_2$ (sulfur dioxide), which is present in diesel exhaust from the combustion of sulfur containing fuels. The oxidation of $SO_2$ leads to the generation of sulfate particulates and may significantly increase total particulate emissions despite the decrease of the SOF. The DOC 106 of the present invention is designed to be selective so that it obtains a compromise between sufficiently high HC and SOF activity and acceptably low $SO_2$ activity. The DOC 106 also oxidizes several non-regulated HC-derived emissions, such as aldehydes or PAHs, as well as helping to reduce or eliminate the odor of diesel exhaust.

The filter assembly 108 is constructed of a honeycomb filter structure 124 formed of silicone carbide, suspended in INTERAM and encased in a stainless steel container. The form factor (internal cross-sectional surface area) of the filter assembly 108 is approximately the same size as the coil assembly 120 and DOC 106. The filter assembly 108 has no catalytic coatings. The filter assembly 108 is designed to capture particulate matter at a filtration rate of greater than or equal to 85% of total particulate matter output and to sustain the temperature (+340° C.) of normal oxidation of particulate matter.

As noted, when the exhaust backpressure reaches the regeneration threshold, it will start the regeneration process, which occurs when a signal is sent to the power relay, which will close and energize the coil assembly 120 with power from the AC generator 32 of the engine 12. As the coil assembly 120 heats up, the temperature of the exhaust gases will increase, while also increasing engine load, which also increase exhaust temperature. Once the exhaust gas reaches a temperature of around 340° C., the particulate material in the filter assembly 108 will ignite, in combination with $NO_2$ (generated by the DOC 106) and $O_2$ and convert the particulate matter to ash.

Once regeneration has occurred, exhaust backpressure will return to its normal low limit of approximately 15 inches of water and the filter assembly 108 will begin to trap particulate matter again until the upper limit is reached and the process is restarted. This process continues in real-time (as the engine 12 is in use versus many prior art systems that require the filter to be removed for active regeneration to be performed) until sufficient ash builds up within the filter assembly 108 to require service, after about 2,000 hours of use of engine 12. The active regeneration process and monitoring of DPF system conditions and ash build up is monitored by the ECU, as further discussed below.

Figure 6:
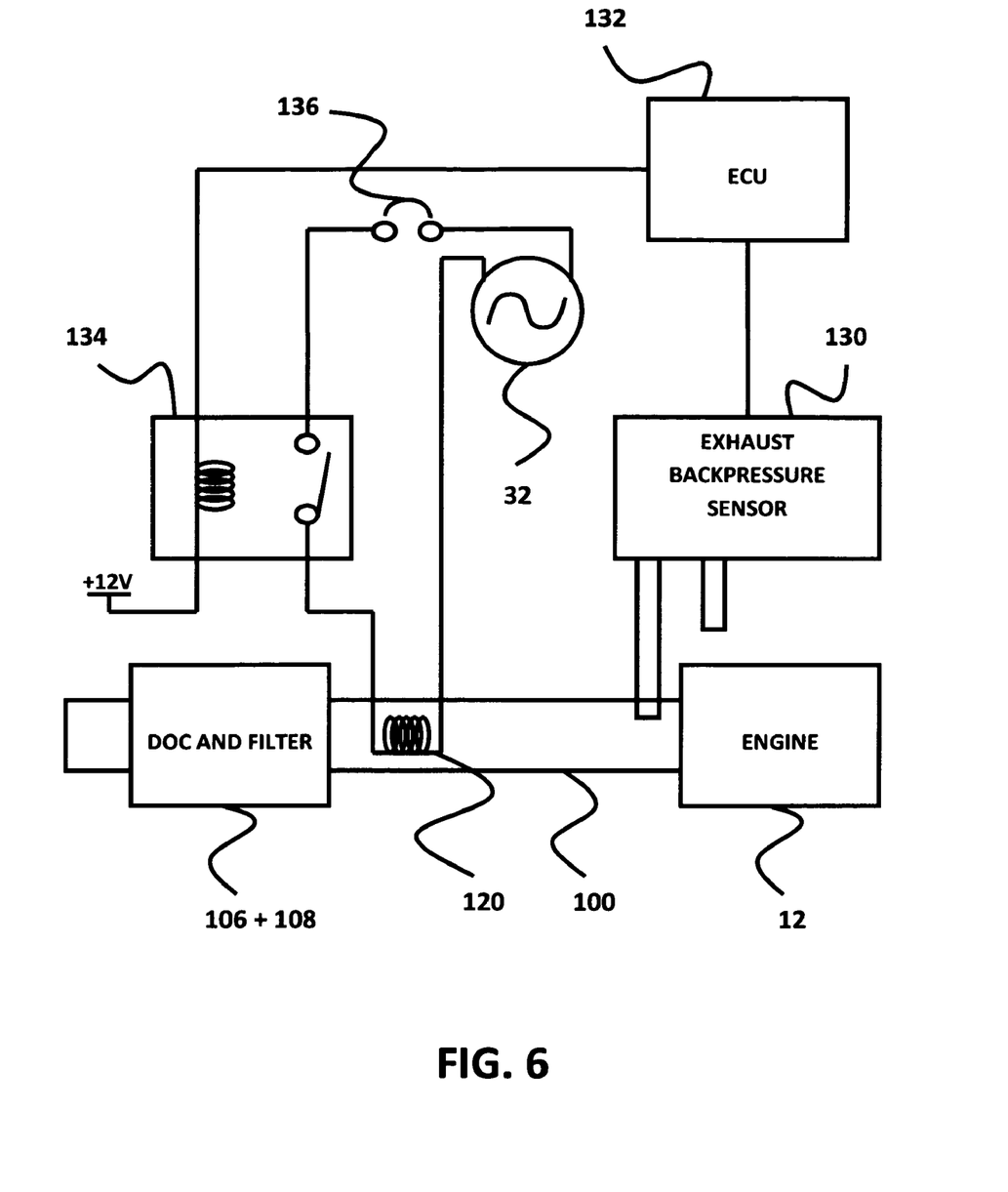
FIG. 6 is block diagram illustrating the interaction between the DPF system and the ECU.

FIG. 6 provides a block diagram representation of the interaction between the various components of the DPF system and the ECU. The engine 12 is connected to first exhaust pipe 100, which passes exhaust gases past the coil assembly 120 and into the DOC 106 and filter assembly 108. The exhaust pressure sensor 130 measures backpressure within the pipe 100 and is electrically connected to the ECU 132. The ECU 132 is also electrically connected to the normally open power relay 134. When the relay 134 closes under direction of the ECU, based on a backpressure threshold level being detected by the sensor 130, AC power from the generator 32 is directed to the coil assembly 120, causing it to heat. A temperature sensor (not shown) could be used to detect when the temperature of the heating element has reached a sufficient temperature to ignite particulate matter in the filter assembly 108 and cause the power relay 134 to open and cut off power to the coil assembly 120, or the coil assembly 120 could simply be left on for a sufficient period of time to assure that it has heated sufficiently, as further described below. An appropriately sized circuit breaker 136 is in-line between the power relay 134 and the generator 32 to cut off power to the power relay 134 in the event of a detected problem.

Figure 7:
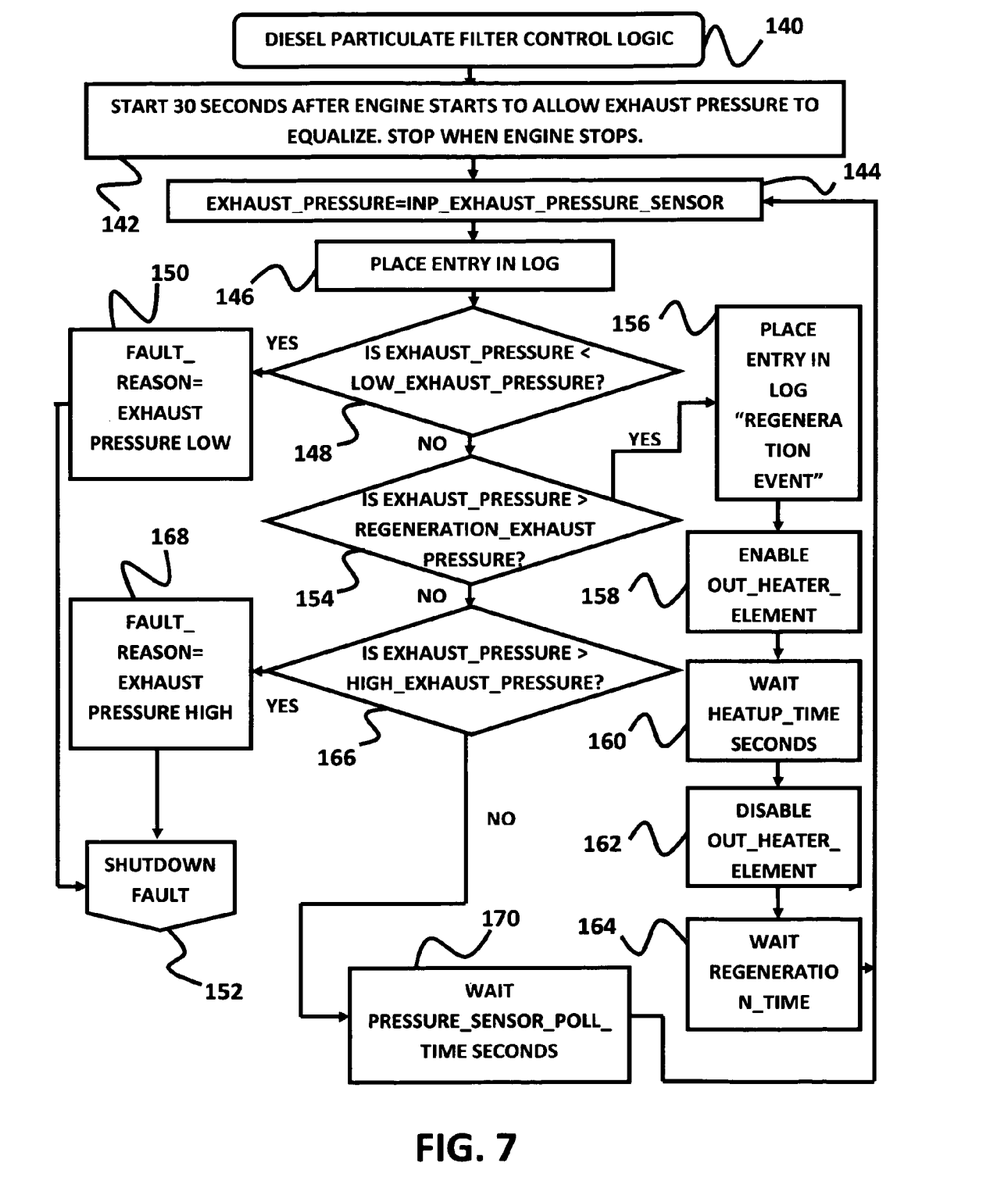
FIG. 7 is a flow chart illustrating the logical operation of the ECU in conjunction with the DPF system in accordance with the present invention.

FIG. 7 provides a flow diagram that illustrated the logical operation 140 of the ECU 132 in relationship to the DPF system. The operation of an ECU 132 is more fully described in published United States Patent Application 2008/0023965, which is incorporated in its entirety herein by reference. The ECU's logical operation starts by constantly monitoring the engine 12 to see if it is running or stopped, step 140. The ECU starts the DPF system monitoring process thirty seconds after the engine 12 starts, step 142, so as to allow exhaust pressure within the exhaust of the engine 12 to equalize. The ECU 132 stops the logical operation when the engine stops, step 142. Once the operation 140 has started, the exhaust backpressure at the sensor 130 is measured, step 144, and periodically an entry is placed in the ECU log to record the time, date, run time on the engine 12, and the backpressure in kilopascals, step 146.

The next step is to check the backpressure to determine if it is below a lower threshold level that indicates a problem with the engine 12, step 148, which refers to the lower threshold as the low exhaust pressure. If the backpressure is below a lower threshold, such as 4 inches of water, it is assumed that there is a problem with the engine 12, such as a broken pipe 100 or a malfunctioning part or component that will prevent the DPF system from functioning properly, step 150. If that is the case, then the engine is shut down in step 152 and the fault noted in step 150 is recorded as the reason for the shutdown. If the backpressure is not below the lower threshold, the next step is to determine if the backpressure has reached the regeneration threshold of 23 to 30 inches of water, step 154, which refers to the regeneration threshold as the regeneration exhaust pressure.

If the regeneration threshold has been reached in step 154, an entry is placed in the log to note the regeneration event, along with the time and engine hours, step 156. A signal is then sent to the power relay 134, which closes, sending power from the generator 32 to coil assembly 120 to heat it up, step 158. Given the particular coil assembly 120 being used, less than twenty minutes is required to generate sufficient heat to start the oxidation process, so after 20 minutes, step 160, the coil assembly 120 is turned off, step 162. The regeneration process will then take about 40 minutes to complete, step 164, given the form factor of the DPF system of the present invention, so the ECU 132 waits this period of time before checking the backpressure again in step 144. If the regeneration threshold has not been reached, the ECU 132 will then perform a safety check just to make sure the backpressure has not exceeded an upper threshold limit of 36 to 47 inches of water, step 166, which refers to the upper threshold as the high exhaust pressure. If it has, a fault is detected, step 168, and the engine is shut down, step 152. If not, the ECU will wait about five seconds, step 170, and start the monitoring process over again.

As an alternative to the above, the ECU can maintain a log of the times that the backpressure has indicated that the regeneration threshold has been reached and the sensor 130 is still indicating that the backpressure has not decreased below the regeneration threshold. If this log exceeds two, indicating that regeneration has been twice attempted and the backpressure has not been reduced, then the ECU locks the DPF system from attempting regeneration, which could shut the engine down due to high exhaust backpressure. Under such circumstances, the filter within the filter assembly 108 may have become clogged or something else may have gone wrong, such that constantly restarting the regeneration process will only lead to bigger problems.

The present invention, while illustrated and described in terms of a preferred embodiment and alternatives, is not limited to the particular description contained in this specification. Additional alternative or equivalent components and steps could be used to practice the present invention.

What is claimed is:

1. A small form factor active/passive diesel particulate filter system for a diesel auxiliary power unit installed on a body having a main diesel engine, comprising:
    an exhaust pipe connected to an exhaust port of the diesel auxiliary power unit for carrying an exhaust gas including a particulate matter output by the diesel auxiliary power unit, the exhaust pipe having a first internal cross-sectional surface area;
    a sensor connected to the exhaust pipe for monitoring an exhaust backpressure within the exhaust pipe;
    a coil assembly connected to the exhaust pipe and having a second internal cross-sectional surface area of less than 150% of the size of the first internal cross-sectional surface area for heating the exhaust gas carried by the exhaust pipe to the coil assembly and actively igniting the particulate matter;
    a relay switch connected to an AC power generator of the diesel auxiliary power unit and the coil assembly for providing power to the coil assembly;
    an oxidation catalyst connected to the coil assembly having a third internal cross-sectional surface area approximately equal to the second internal cross-sectional surface area for injecting $NO_2$ into the exhaust gas passing through the oxidation catalyst to passively ignite the particulate matter after the coil assembly stops actively igniting the particulate matter;
    a filter assembly connected to the oxidation catalyst having a fourth internal cross-section surface area approximately equal to the third internal cross-sectional surface area for trapping a large percentage of the particulate matter; and
    an electronic control unit connected to the sensor for receiving a first signal from the sensor representative of the exhaust backpressure within the exhaust pipe and sending a second signal to the relay switch when the first signal represents a regeneration threshold for exhaust backpressure, the second signal causing the relay switch to provide power to the coil assembly from the AC power generator.

2. The filter system of claim 1, wherein the coil assembly includes a wire wound heating coil encased in a ceramic housing having a honeycomb-shaped passageway through which exhaust gas can pass and be heated by the wire wound heating coil.

3. The filter system of claim 1, wherein the relay switch is normally open, and the second signal closes the relay switch for a predetermined period of time.

4. The filter system of claim 3, wherein the predetermined period of time is based on a period of time required to heat the exhaust gas to a temperature that will cause the particulate matter to ignite.

5. The filter system of claim 1, wherein the oxidation catalyst includes a monolith honeycomb substrate structure coated with a platinum group metal catalyst.

6. The filter system of claim 1, wherein the filter assembly includes a honeycomb filter structure formed of silicone carbide.

7. The filter system of claim 1, wherein the regeneration threshold is approximately 23 to 30 inches of water when the diesel auxiliary power unit is a two cylinder engine or a three cylinder engine.

8. The filter system of claim 1, wherein the large percentage is 85 percent or greater.

9. The filter system of claim 1, wherein the first internal cross-sectional surface area is approximately 2.40 square inches.

10. The filter system of claim 1, wherein the electronic control unit sends a third signal to the diesel auxiliary power unit shutting down the diesel auxiliary power unit if the first signal represents a low threshold indicating a problem with the filter system.

11. The filter system of claim 1, wherein the electronic control unit sends a third signal to the diesel auxiliary power unit shutting down the diesel auxiliary power unit if the first signal represents a high threshold indicating a problem with the filter system.

* * * * *